United States Patent [19]

Vogeli

[11] 3,968,970
[45] July 13, 1976

[54] STUFFING BOX

[75] Inventor: Ernst Vogeli, Wiesendangen, Switzerland

[73] Assignee: Sulzer Brothers Limited, Winterthur, Switzerland

[22] Filed: Mar. 3, 1975

[21] Appl. No.: 554,710

[30] Foreign Application Priority Data
Mar. 5, 1974 Switzerland.......................... 3033/74

[52] U.S. Cl............................... 277/106; 277/104; 277/123
[51] Int. Cl.².......................................... F16J 15/18
[58] Field of Search ........... 277/106, 105, 111, 123, 277/142, 104, 102

[56] References Cited
UNITED STATES PATENTS

| 499,422 | 6/1893 | Griswold | 277/123 |
| 1,011,236 | 12/1911 | Norris | 277/106 |
| 2,318,253 | 5/1943 | Nagle | 277/106 |
| 3,123,366 | 3/1964 | Comfort | 277/111 |
| 3,188,048 | 6/1965 | Sutherland | 277/102 |
| 3,259,358 | 7/1966 | Tripoli | 277/102 |

*Primary Examiner*—Richard E. Aegerter
*Assistant Examiner*—L. Footland
*Attorney, Agent, or Firm*—Kenyon & Kenyon Reilly Carr & Chapin

[57] ABSTRACT

The pressure springs for biasing the yoke and sleeve against the packing are mounted within an assembly unit formed by an annular carrier and a cap nut. The cap nut is threaded onto the housing while the annular carrier carries two bolts which pass through the yoke. Upon turning of the nuts on these bolts against the yoke, the annular carrier is moved toward the yoke to compress the springs while the yoke and sleeve are moved against the packing to compress the packing.

10 Claims, 1 Drawing Figure

U.S. Patent  July 13, 1976  3,968,970
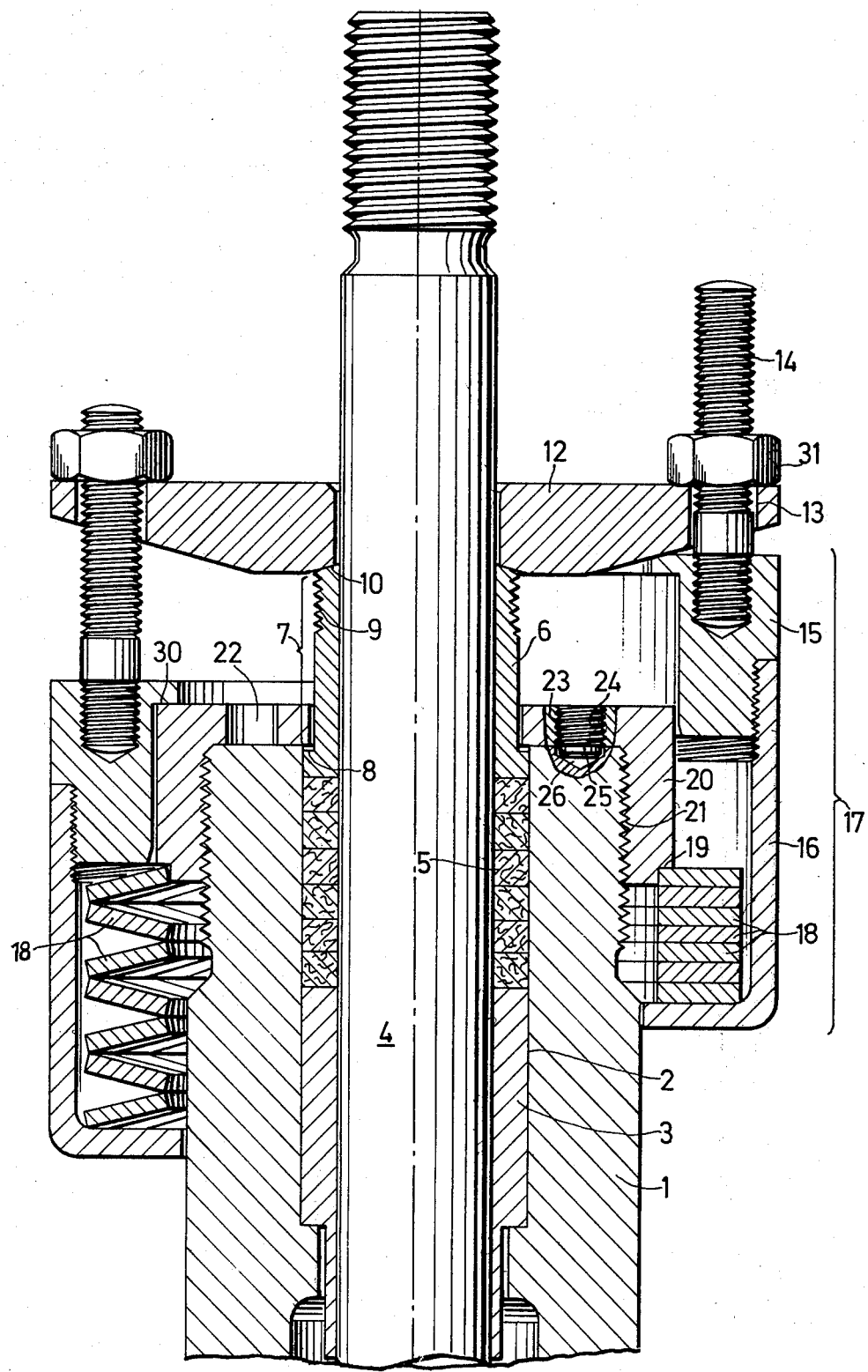

STUFFING BOX

This invention relates to a stuffing box.

Stuffing boxes have been known wherein a packing is compressed under a biasing force of a pressure spring. For example, one such stuffing box which appears in the publication POWER of December, 1973, page 56, includes pressure applying springs which are located in a line of force between a yoke and the stuffing box housing. These springs are screwed down on a packing by at least two bolts via the yoke. To this end, the springs are disposed between the yoke and two nuts mounted on the bolts. However, these types of stuffing boxes require a great overall length which is a disadvantage.

Accordingly, it is an object of the invention to decrease the overall length of a stuffing box utilizing pressure applying springs.

It is another object of the invention to increase the working space of the pressure applying springs of a stuffing box which uses the springs to compress a packing of the stuffing box.

It is another object of the invention to be able to disassemble a spring biased packing of a stuffing box without disassembling the spring.

Briefly, the invention provides a stuffing box comprising a housing having a packing therein, a means including a yoke for compressing the packing and a pressure spring means with an annular carrier about the housing and spring means. The spring means is mounted in fixed relation to the housing at one end in abutting relation with the annular carrier at the other end. In addition, at least two bolts are threadably mounted in the carrier and pass through the yoke. The bolts each carry a nut which is threaded against the yoke.

In use, the nuts on the bolts are threaded against the yoke in order to move the carrier relative to the housing for compressing the spring means while also moving the compressing means against the packing.

In order to fix the spring means relative to the housing, use is made of a cap nut which is threaded onto the housing and locked in place by a suitable safety element. This cap nut abuts one end of the spring means and is mounted within the carrier so as to form an assembly unit of the cap nut, spring means and carrier. This assembly unit can remain assembled while the packing is disassembled, repaired or replaced.

The annular carrier is formed of two parts, namely, an annular ring which threadably receives the bolts and a sleeve which is secured to the ring in surrounding relation to the spring means. The sleeve is also formed to abut an end of the spring means opposite the cap nut.

The spring means is in the form of a packet of Belville springs. This ensures a uniform distribution of the spring force over the circumference of the stuffing box. Upon movement the carrier and cap nut together, these plate springs become prestressed.

The construction of the stuffing box is thus one which affords a generally compact structure of minimal overall length. Further the space available for the spring means is considerably greater than in previously known stuffing boxes of this type. Thus, a greater spring-work can be housed. Furthermore, as noted above, the spring means need not be disassembled in order to disassemble the packing. Thus, the possibility of losing the spring means is eliminated. In addition, after reassembly of the packing, this ensures that the packing is under the specified pressure.

By virtue of the stuffing box construction the length of the screw threaded bolts can be reduced to a minimum. Also, for disassembly of the stuffing box, the number of loose parts is reduced to a minimum.

In accordance with the invention, the pressure sleeve is of reduced diameter at its yoke-side end to form a shoulder at the packing end which is of a diameter larger than the inner diameter of the cap nut. This gives increased reliability. Thus, if the bolts should break, for example because of an excessive force exerted during a tightening-up of the stuffing box, even though such a tightening-up is not necessary, the sleeve and the packing would not be blown out should any medium pressure still exist on the packing. Thus, an otherwise serious accident can be avoided.

These and other objects and advantages of the invention will become more apparent from the following detailed description and appended claims taken in conjunction with the accompanying drawings in which:

The drawing illustrates an axial sectional view of a stuffing box according to the invention with the left-hand side as viewed illustrating the packing in an unstressed state and the right-hand side illustrating the packing in a stressed state.

Referring to the drawing, the stuffing box has a housing 1 including a bore 2 in which a spindle guide 3 for a spindle 4, for example of a valve is situated. A packing 5, consisting for example of six packing rings, is mounted within the housing 1 above the guide 3. In order to compress the packing 5, a means is mounted above the packing 5 about the spindle 4. This means includes a pressure sleeve 6 mounted coaxially above the packing 5 along with a yoke 12. The sleeve 6 is mounted to be moved relative to the housing 1 to apply pressure on the packing 5 and is of smaller diameter throughout a major region 7 in order to form a shoulder 8 at the lower end. The upper end of the sleeve 6 is formed with a withdrawing screw-thread 9 as well as with a concave spherical face 10. The yoke 12 is of two-armed construction and abuts the face 10 of the sleeve 6. Each arm of the yoke 12 is formed with a bore 13.

A pair of screw-threaded bolts 14 extend through the bores 13 of the yoke 12 and are threadably secured in an annular carrier 17. Each bolt 14 also carries a nut 31 which is threaded against the yoke 12.

The annular carrier 17 is disposed about the housing 1 and includes a ring 15 and a sleeve 16. The ring 15 receives the bolts 14 in a tightly seated manner and is threaded to the sleeve 16. The sleeve 16, in turn, surrounds a pressure spring means formed of a packet of, for example seven, Belville-springs 18 which are mounted concentrically of the packing in a line of force between the yoke 12 and housing 1. The lower end of the sleeve 16 is directed radially inwardly to abut one end of the spring means 18. The opposite end of the spring means 18 abuts against a recess 19 of a cap nut 20 which is threaded via a thread 21 on the housing 1. In this way, the upper end of the spring means 18 is mounted in fixed relation to the housing 1.

The cap nut 20 has two bores 22 (only one of which is shown) symmetrically of the stuffing box axis to receive a two-pin wrench (not shown) for threading of the cap nut 20 on or off the housing 1. The cap nut 20 also has a threaded aperture 23 staggered ninety degrees from the bores 22. This aperture 23 receives a safety element, such as a screw 24, which carries a pin 25 which projects into a blind hole 26 in the housing 1 for preventing turning of the cap nut 20 relative to the housing 1.

The ring 16 of the carrier 17 has an inwardly directed shoulder 30 at the upper end as viewed which is of an inner diameter less than the outer diameter of the cap nut 20. Thus, as shown to the left of the drawing, as viewed, the cap nut 20 is retained within the carrier 17 and together with the carrier 17 and spring means 18 forms an assembly unit. Generally, the ring 15 is screwed tightly to the sleeve 16 when prepared for use but not yet in place on the housing 1. The parts 15, 16 are secured in this position by the blow of a chisel so that the cap nut 20 is pressed against the shoulder 30 of the ring 15 by the pre-stressed springs 18. Generally, the parts 15, 16 are screwed together while the springs 18 are compressed under a manually applied force on the cap nut 20.

In order to assemble the stuffing box, the packing 5 is put in place in the bore 2 after which the pressure sleeve 6 is put in place. Next, the assembly unit 17, 18, 20 is screwed onto the housing 1 via the cap nut 20. If required, the cap nut 20 may come into contact with the pressure sleeve 6. Next, after introduction of the safety screw 24, the yoke 12 is set on the threaded bolts 14. The nuts 31 are then tightened against the yoke 12 until, as shown to the right in the drawing, the yoke 12 is seated on the ring 15. The plate springs 18 are thus completely or almost completely stressed and the stuffing box is ready for use.

As the nuts 31 are tightened, the carrier 17 moves towards the yoke 12 while the yoke 12 and sleeve 6 move against the packing 5 in opposition to the biasing force of the springs 18.

What is claimed is:

1. A stuffing box comprising
 a housing;
 a packing within said housing;
 a sleeve mounted coaxially of said packing for movement relative to said housing to apply pressure on said packing;
 a yoke abutting said sleeve;
 a cap nut threadably mounted on said housing;
 an annular carrier;
 at least one pressure spring mounted between said cap nut and said carrier and biasing said cap nut and said carrier apart, said spring being mounted in a line of force between said housing and said yoke; and
 at least two bolts threadably mounted in said carrier and passing through said yoke for moving said yoke towards said sleeve and said sleeve against said packing in opposition to the biasing force of said spring.

2. A stuffing box as set forth in claim 1 wherein said carrier includes an annular ring threadably receiving said bolts and a second sleeve secured to said ring in surrounding relation to said pressure spring, said second sleeve being disposed in abutting relation with said spring.

3. A stuffing box as set forth in claim 1 wherein said carrier is movable relative to said cap nut to compress said spring and to move said yoke against said sleeve.

4. A stuffing box as set forth in claim 1 wherein said pressure spring is a packet of Belville-springs.

5. A stuffing box as set forth in claim 1 wherein said sleeve includes a shoulder of an outer diameter larger than an inner diameter of said cap nut, said shoulder being disposed between said packing and said cap nut.

6. A stuffing box as set forth in claim 1 which further comprises a safety element for preventing turning of said cap nut relative to said housing.

7. A stuffing box comprising
 a housing;
 a packing within said housing;
 first means for compressing said packing within said housing, said means including a yoke;
 a pressure spring means mounted concentrically of said packing in fixed relation to said housing at one end;
 an annular carrier disposed about said housing and said spring means in abutting relation with a second end of said spring means;
 at least two bolts threadably mounted in said carrier and passing through said yoke; and
 a pair of nuts, each nut being mounted on a respective bolt for threading against said yoke to move said carrier relative to said housing for compressing said spring means while moving said first means against said packing.

8. A stuffing box as set forth in claim 7 wherein said spring means is a packet of Belville springs.

9. A stuffing box as set forth in claim 7 which further includes a cap nut threadably secured on said housing in abutment with said one end of said spring means.

10. A stuffing box as set forth in claim 9 wherein said cap nut, spring means and carrier form an assembly unit with said spring means biasing said cap nut against said carrier.

* * * * *